(12) United States Patent
Aberra

(10) Patent No.: US 8,485,724 B2
(45) Date of Patent: Jul. 16, 2013

(54) THERMOCOUPLE ELECTROMOTIVE FORCE VOLTAGE TO TEMPERATURE CONVERTER WITH INTEGRATED COLD-JUNCTION COMPENSATION AND LINEARIZATION

(75) Inventor: Ezana Hailekiros Aberra, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 347 days.

(21) Appl. No.: 12/851,631

(22) Filed: Aug. 6, 2010

(65) Prior Publication Data

US 2011/0243188 A1 Oct. 6, 2011

Related U.S. Application Data

(60) Provisional application No. 61/319,854, filed on Mar. 31, 2010.

(51) Int. Cl.
*G01K 7/00* (2006.01)

(52) U.S. Cl.
USPC .......................... 374/181; 374/100; 374/179

(58) Field of Classification Search
USPC ................................................. 374/179, 181
See application file for complete search history.

(56) References Cited

U.S. PATENT DOCUMENTS 4,482,261 A * 11/1984 Dewey et al. ................. 374/181
7,489,022 B2 * 2/2009 Torkington et al. ........... 257/666

OTHER PUBLICATIONS

Author: David Potter, Title: "Measuring Temperature with Thermocouples—a Tutorial", Date: Nov. 1966, Publisher: National Instruments Corporation, Application Note 043, pp. 1-16.*
Author: unknown, Title: "SMBUS Basics", Date: Jul. 12, 2011, Publisher: Philips Semiconductors, pp. 1, URL: www.i2cbus.com/smbus.html.*
Hadley, I.C.D. et al: "Inexpensive Digital Thermometer for Measurements on Semiconductors", International Journal of Electronics, Taylor and Francis Ltd. London, GB, vol. 70, No. 6, Jun. 1, 1991, pp. 1155-1162, XP000240225, ISSN: 0020-7217 (8 pages), Jun. 1990.
Segarra, D.: "Thermocouple Interfaces to Serial Port", EDN Electrical Design News, Reed Business Information, Highlands Ranch, CO, US, vol. 40, No. 23, Nov. 9, 1995, pp. 104-106, XP000548296, ISSN: 0012-7515 (4 pages), Nov. 9, 1995.
"Implementing Cold-junction Compensation in Thermocouple Applications", Dallas Semiconductor, Maxim, Mar. 19, 2007, XP002642371, http://pdfsery.maxim-ic.com/en/an/AN4026.pdf (8 pages), Mar. 19, 2007.
International Search Report and Written Opinion for Application No. PCT/US2011/030143 (10 pages), Jul. 27, 2011.

* cited by examiner

*Primary Examiner* — Lisa Caputo
*Assistant Examiner* — Roger Hernandez-Prewitt
(74) *Attorney, Agent, or Firm* — King & Spalding L.L.P.

(57) ABSTRACT

A mixed-signal integrated circuit comprises: 1) an analog front end having differential inputs adapted for directly connecting to at least one thermocouple, 2) an analog-to-digital (ADC) for converting the thermocouple voltages to digital representations thereof, 3) a linearization circuit capable of performing the multi-order polynomial equations for converting the thermocouple electromotive voltages (the digital representations) to linear temperature measurement units by using coefficients unique to each type of thermocouple from a coefficients table based upon the National Institute of Standards and Technology (NIST), 4) a integrated temperature sensor for measuring cold junction temperature, 5) optionally, an input multiplexer for selecting each of a plurality of thermocouples for measurement thereof, 6) optionally, registers for storing measured temperature values, high and low set points, alarm limits, etc., and 7) a communications interface for setting parameters and receiving temperature information.

22 Claims, 3 Drawing Sheets

THERMOCOUPLE ELECTROMOTIVE FORCE VOLTAGE TO TEMPERATURE CONVERTER WITH INTEGRATED COLD-JUNCTION COMPENSATION AND LINEARIZATION

RELATED PATENT APPLICATION

This application claims priority to commonly owned U.S. Provisional Patent Application Ser. No. 61/319,854; filed Mar. 31, 2010; entitled "Thermocouple Electromotive Force Voltage to Temperature Converter with Integrated Cold-Junction Compensation and Linearization," by Ezana Hailekiros Aberra; and is hereby incorporated by reference herein for all purposes.

TECHNICAL FIELD

The present disclosure relates to mixed signal integrated circuits, and more particularly, to mixed-signal integrated circuits used with thermocouple sensors and having a programmable analog amplifier, National Institute of Standards and Technology (NIST) based thermocouple linearization tables, an isothermal block temperature sensor for cold junction compensation, and, optionally, an input multiplexer and/or registers for storing measured temperature values, high and low set points, and/or alarm limits.

BACKGROUND

Existing thermocouple temperature sensor instrumentation interfaces comprise complex, power consuming, and a costly plurality of analog instrumentation and linearization circuits. Cold-junction compensation is generally implemented using a discrete standalone sensor such as a thermistor or RTD.

SUMMARY

Therefore, it is desired to provide a low power integrated circuit solution for commercial and industrial equipment thermal management that comprises a direct instrument interface to and linearization of the voltages from at least one thermocouple, with cold-junction temperature compensation and conversion of those linearized and cold junction temperature compensated voltages to temperature measurement units, e.g., Centigrade, Fahrenheit, Kelvin, etc., over a wide measurement temperature range with excellent measurement accuracy and resolution. For example, but not limited to, a measurement temperature range from about −270 degrees Celsius to about 1300 degrees Celsius and having a temperature measurement resolution of better than 0.5 degrees Celsius.

According to the teachings of this disclosure, a mixed-signal integrated circuit comprises: 1) an analog front end having differential inputs adapted for directly connecting to at least one thermocouple, 2) an analog-to-digital (ADC) for converting the thermocouple voltages to digital representations thereof, 3) a linearization circuit capable of performing the multi-order polynomial equations for converting the thermocouple electromotive voltages (the digital representations) to linear temperature measurement units by using coefficients unique to each type of thermocouple from a coefficients table based upon the National Institute of Standards and Technology (NIST), 4) an integrated cold junction temperature sensor for measuring cold junction temperature, and 5) a communications interface for setting parameters and receiving temperature information. Further optional features are, for example but not limited to, 6) an input multiplexer for selecting each of a plurality of thermocouples for measurement thereof, 7) an analog programmable gain amplifier (PGA), and 8) registers for storing measured temperature values, high and low set points, alarm limits, etc. The linearization circuit may be part of a digital processor having a memory, e.g., a microcontroller, microprocessor, digital signal processor, application specific integrated circuit (ASIC), programmable logic array (PLA), etc. The digital processor may also control the input multiplexer, PGA, store the register values in the memory, and communicate via a serial interface.

The ADC measures the thermocouple(s) electromotive force (EMF) voltage(s) generated at the thermocouple hot junction at typically a measurement resolution of about two (2) microvolts per least significant bit (LSb). The cold-junction temperature sensor measures the ambient temperature of the thermocouple cold-junction. The digital processor, e.g., microcontroller, reads the ADC output data and the integrated temperature sensor data. The digital ADC output data and the integrated temperature sensor are summed and then linearized using a polynomial equation of as high as $9^{th}$ order depending upon the type of thermocouple being used. The coefficients used in the polynomial equation are supplied from a look-up table having appropriate values for each type of thermocouple, wherein these values are standard values provided by the National Institute of Standards and Technology (NIST). After linearization the digital data may be converted to desired temperature measurement units, e.g., Centigrade, Fahrenheit, Kelvin, etc., over a wide measurement temperature range with excellent measurement accuracy and resolution. The corrected, linearized and converted temperature measurement units may be available through a serial interface, e.g., $I^2C$, SPI, etc., and/or may be stored in registers of a memory.

BRIEF DESCRIPTION OF THE DRAWINGS

A more complete understanding of the present disclosure thereof may be acquired by referring to the following description taken in conjunction with the accompanying drawings wherein.

Figure 1:
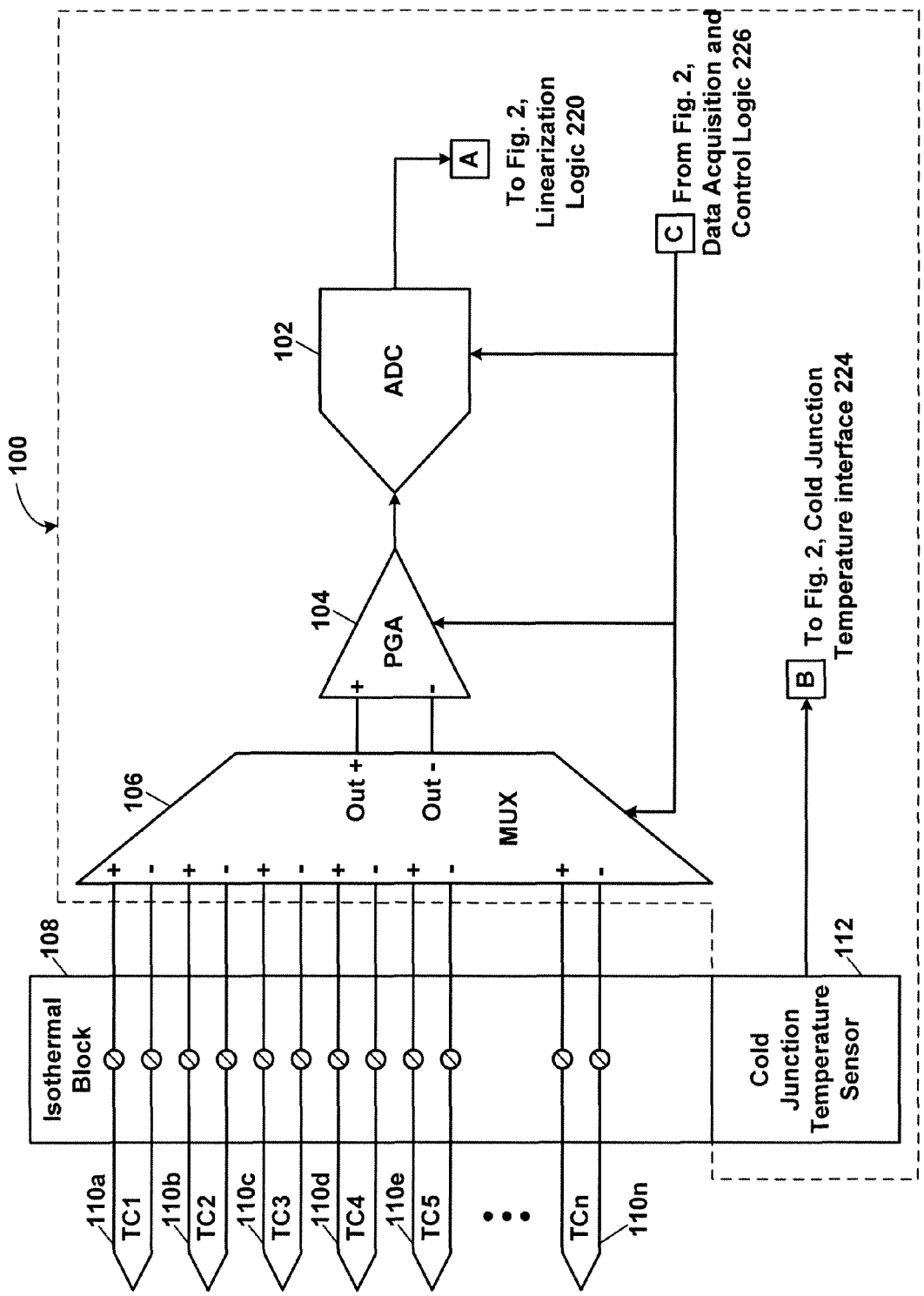
FIG. 1 illustrates a schematic block diagram of an analog front end of a thermocouple interface and linearization integrated circuit device, according to a specific example embodiment.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an analog front end of a thermocouple interface and linearization integrated circuit device, according to a specific example embodiment. The analog front end of a thermocouple interface and linearization integrated circuit device, generally represented by the numeral 100, may comprise an analog multiplexer 106, a programmable gain amplifier (PGA) 104, an analog-to-digital converter (ADC) 102, and a cold junction temperature sensor 112. An external to the integrated circuit device is an isothermal block 108 used for connection to the cold junctions of at least one thermocouple 110. The cold junction temperature sensor 112 is thermally coupled to the isothermal block 108. The cold junction temperature from the cold junction temperature sensor 112 is used in the temperature correction of the linearized temperature values of the at least one thermocouple 110.

Figure 2:
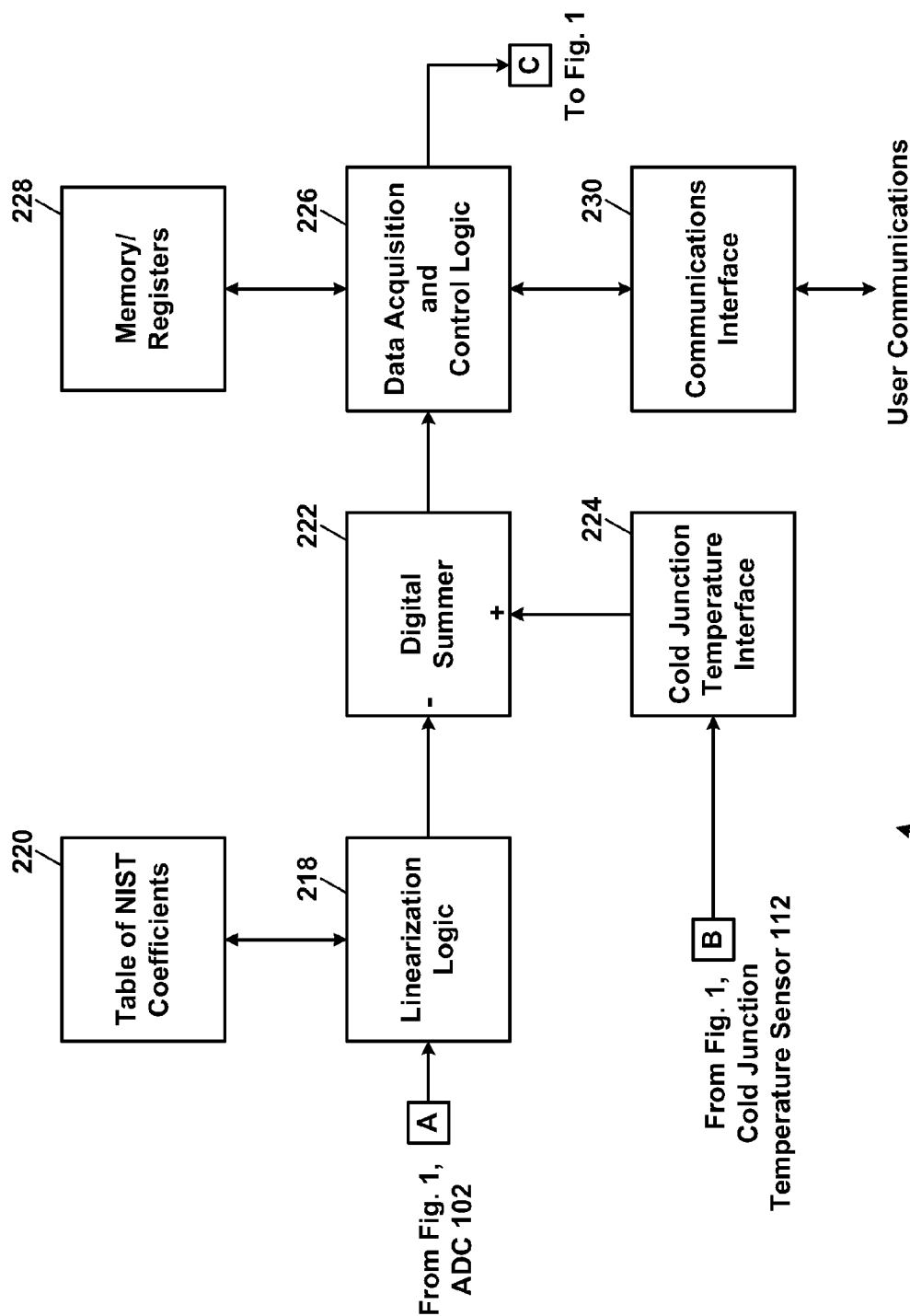
FIG. 2 illustrates a schematic block diagram of a digital processing back end of a thermocouple interface and linearization integrated circuit device, according to a specific example embodiment.

The analog multiplexer 106 enables interfacing to a plurality of thermocouples 110a-110n (through the isothermal block 108). The PGA 104 may be used to increase the analog input sensitivity of the ADC 102. The analog multiplexer 106, the PGA 104 and the ADC 102 may be controlled by data acquisition and control logic 226 (FIG. 2). The ADC 102 may be, for example but is not limited to, a Delta-Sigma ADC.

Referring to FIG. 2, depicted is a schematic block diagram of a digital processing back end of a thermocouple interface and linearization integrated circuit device, according to a specific example embodiment. The digital processing back end of the thermocouple interface and linearization integrated circuit device, generally represented by the numeral 200, may comprise a linearization processor 218, a table of NIST coefficients 220, a digital summer 222, a cold junction temperature interface 224, data acquisition and control logic 226, memory and/or registers 228, and a communications interface 230, e.g., serial I$^2$C, SPI, SMBus, etc.

Once the uncompensated voltage from the thermocouple 110 has been digitized with the ADC 102, the linearization logic 218 solves for an appropriate to the thermocouple type, e.g., J, K, B, E, N, R, S, T, etc., multi-order polynomial equation using the NIST constants stored in the table of NIST coefficients 220. The table of NIST coefficients 220 may be stored in a non-volatile memory, e.g., electrically erasable and programmable read only memory (EEPROM).

Once the digital voltage representations from the thermocouple 110 have been linearized, a cold junction temperature adjustment is made in the digital summer 222. The purpose of the cold junction temperature adjustment is to normalize the thermocouple hot-junction values to a 0 degree Centigrade reference temperature. The cold junction temperature sensor 112 may be, for example but not limited to, a thermistor, RTD, etc., and its analog output may be converted into digital values with the cold junction temperature interface 224 before being applied to the digital summer 222.

The data acquisition and control logic 226 may be used to convert the linearized and normalized digital temperature values from the digital summer 222 into desired temperature measurement units, e.g., Centigrade, Fahrenheit, Kelvin, etc. The data acquisition and control logic 226 may also store and/or compare various measured temperature values in the memory/registers 228. High and low limit temperature values may be stored in the memory/registers 228 for alarm and/or control functions.

The communications interface 230 may be used for reading the temperature values, controlling temperature related activities, e.g., process control; entering set points and alarm limits into the memory/registers 228, etc.

Figure 3:
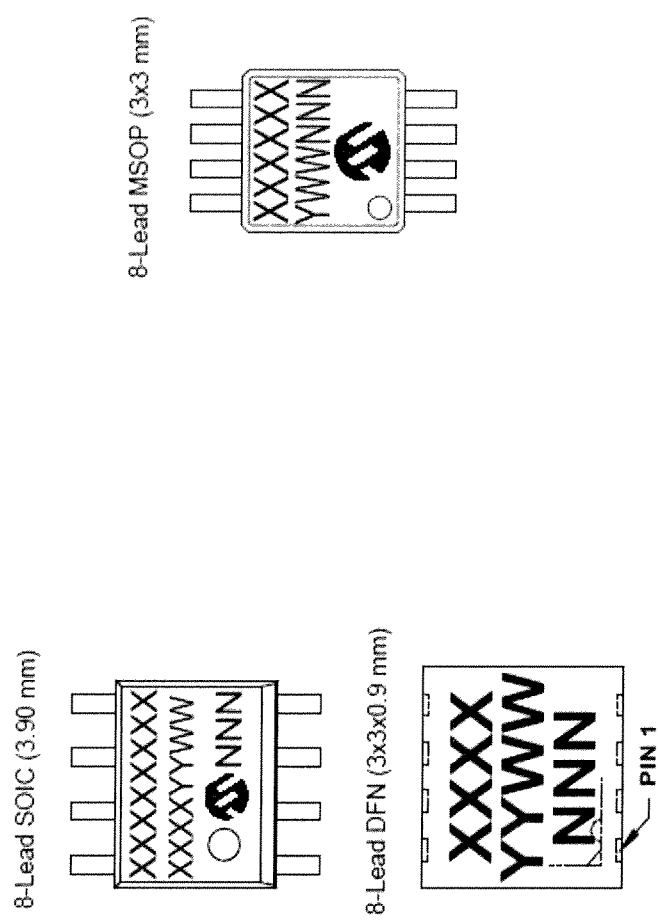
FIG. 3 illustrates several conventional integrated circuit packages.

Integrated circuit packages for the thermocouple interface and linearization integrated circuit device may be, for example but not limited to, Mini Small Outline Package (MSOP), Small Outline Integrated Circuit (SOIC), Dual Flat No-Lead (DFN), etc. as exemplary shown in FIG. 3. The DFN package is preferred due to its better cold junction thermal conduction when the integrated circuit package is closely coupled thermally to the isothermal block 108.

It is contemplated that a mixed-signal integrated circuit device such as a microcontroller may include all elements disclosed herein except for the isothermal block 108 and thermocouples 110. The isothermal block 108 may be adapted to facilitate connecting to the cold side wires of the at least one thermocouple 110, e.g., screw terminals for ease of connection to the wires of the thermocouple 110. It is the intention of this disclosure to present a simple, low cost and easy to implement, but powerful, integrated circuit device for facilitating integration and use of thermocouples into commercial and industrial temperature monitoring and control systems.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A mixed-signal integrated circuit for converting thermocouple electromotive force voltages to temperature values and having integrated cold-junction compensation and linearization, comprising:
   an analog-to-digital converter (ADC) having an analog input operable to be coupled to a thermocouple;
   linearization logic coupled to a digital output of the ADC;
   a nonvolatile memory storing a table of NIST coefficients for the thermocouple, wherein the linearization logic is coupled to the nonvolatile memory and uses coefficients from the NIST coefficient table when solving for a polynomial equation associated with linearization of the thermocouple voltages;
   an integrated cold junction temperature sensor;
   a cold junction temperature sensor interface for converting temperature of the cold junction temperature sensor into digital cold junction temperature values;
   a digital summer for adding the digital cold junction temperature values to the linearized digital temperature values from the linearization logic for providing cold junction temperature compensated digital temperature values normalized to a temperature base;
   data acquisition and control logic coupled to an output of the digital summer for receiving the normalized cold junction temperature compensated digital temperature values and making available those normalized cold junction temperature compensated digital temperature values available to an external system;
   and
   an integrated circuit package for the mixed-signal integrated circuit designed to be thermally coupled to a isothermal connection block of the thermocouple.

2. The mixed-signal integrated circuit according to claim 1, wherein the temperature base is zero (0) degrees Centigrade.

3. The mixed-signal integrated circuit according to claim 1, further comprising a programmable gain amplifier (PGA) coupled between the thermocouple and the ADC, wherein the PGA is controlled by the data acquisition and control logic.

4. The mixed-signal integrated circuit according to claim 3, further comprising an analog multiplexer having an output coupled to the input of the PGA, and a plurality of inputs used for selectably coupling each one of a plurality of thermocouples to the PGA, wherein the analog multiplexer is controlled by the data acquisition and control logic.

5. The mixed-signal integrated circuit according to claim 1, further comprising memory registers coupled to the data acquisition and control logic, and adapted to store and retrieve digital values selected from the group consisting of set points, alarm limits, and selected ones of the normalized cold junction temperature compensated digital temperature values.

6. The mixed-signal integrated circuit according to claim 1, further comprising a serial communications interface coupled to the data acquisition and control logic for communicating the normalized cold junction temperature compensated digital temperature values to the external system.

7. The mixed-signal integrated circuit according to claim 6, the serial communications interface is selected from the group consisting of I$^2$C, SPI, and SMBus.

8. The mixed-signal integrated circuit according to claim 1, wherein the data acquisition and control logic converts the normalized cold junction temperature compensated digital temperature values to temperature representations selected from the group consisting of Centigrade, Fahrenheit, and Kelvin.

9. The mixed-signal integrated circuit according to claim 1, wherein the thermocouple is selected from the group consisting of J, K, B, E, N, R, S, and T type thermocouples.

10. The mixed-signal integrated circuit according to claim 1, wherein the table of NIST coefficients stored in the nonvolatile memory are for thermocouples selected from the group consisting of J, K, B, E, N, R, S, and T type thermocouples.

11. The mixed-signal integrated circuit according to claim 1, wherein the integrated circuit package is a Dual Flat No-Lead (DFN) integrated circuit package.

12. The mixed-signal integrated circuit according to claim 1, wherein the integrated circuit package is selected from the group of integrated circuit packages consisting of Mini Small Outline Package (MSOP), and Small Outline Integrated Circuit (SOIC).

13. A system for converting thermocouple electromotive force voltages to temperature values and having integrated cold-junction compensation and linearization, said system comprising:
a mixed-signal integrated circuit device comprising:
   a programmable gain amplifier (PGA) having an analog input and an analog output;
   an analog-to-digital converter (ADC) having an analog input coupled to the analog output of the PGA;
   an analog multiplexer having an output coupled to the input of the PGA, and a plurality of inputs used for selectably coupling each one of a plurality of thermocouples to the PGA;
   linearization logic coupled to a digital output of the ADC;
   a nonvolatile memory storing a table of NIST coefficients for the plurality of thermocouples, wherein the linearization logic is coupled to the nonvolatile memory and uses coefficients from the NIST coefficient table when solving for a polynomial equation associated with linearization of thermocouple voltages from a selected one of the plurality of thermocouples;
   an integrated cold junction temperature sensor;
   a cold junction temperature sensor interface for converting temperature of the cold junction temperature sensor into digital cold junction temperature values;
   a digital summer for adding the digital cold junction temperature values to the linearized digital temperature values from the linearization logic for providing cold junction temperature compensated digital temperature values normalized to a temperature base; and
   data acquisition and control logic coupled to an output of the digital summer for receiving the normalized cold junction temperature compensated digital temperature values and making available those normalized cold junction temperature compensated digital temperature values available to the system, and
   an integrated circuit package for the mixed-signal integrated circuit designed to be thermally coupled to a isothermal connection block of a thermocouple; and
at least one thermocouple coupled with an isothermal block in close proximity to the mixed-signal integrated circuit for electrically coupling the thermocouple to the analog multiplexer or the PGA, wherein the close proximity provides a thermally coupling between the integrated cold junction temperature sensor and the isothermal block for temperature measurement thereof.

14. The system according to claim 13, wherein the temperature base is zero (0) degrees Centigrade.

15. The system according to claim 13, further comprising memory registers coupled to the data acquisition and control logic, and adapted to store and retrieve digital values selected from the group consisting of set points, alarm limits, and selected ones of the normalized cold junction temperature compensated digital temperature values.

16. The system according to claim 13, further comprising a serial communications interface coupled to the data acquisition and control logic for communicating the normalized cold junction temperature compensated digital temperature values to a user.

17. The system according to claim 16, the serial communications interface is selected from the group consisting of I$^2$C, SPI, and SMBus.

18. The system according to claim 13, wherein the data acquisition and control logic converts the normalized cold junction temperature compensated digital temperature values to temperature representations selected from the group consisting of Centigrade, Fahrenheit, and Kelvin.

19. The system according to claim 13, wherein the plurality of thermocouples are selected from the group consisting of J, K, B, E, N, R, S, and T type thermocouples.

20. The system according to claim 13, wherein the table of NIST coefficients stored in the nonvolatile memory are for thermocouples selected from the group consisting of J, K, B, E, N, R, S, and T type thermocouples.

21. The system according to claim 13, wherein the integrated circuit package is a Dual Flat No-Lead (DFN) integrated circuit package.

22. The system according to claim 13, wherein the integrated circuit package is selected from the group of integrated circuit packages consisting of Mini Small Outline Package (MSOP), and Small Outline Integrated Circuit (SOIC).

* * * * *